May 12, 1970  F. H. SCHWAIGER  3,511,165
WORT COOLER

Filed April 10, 1967

INVENTOR:
FRANK H. SCHWAIGER
BY
Gravely, Lieder & Woodruff
ATTORNEYS.

May 12, 1970     F. H. SCHWAIGER     3,511,165

WORT COOLER

Filed April 10, 1967     2 Sheets-Sheet 2

INVENTOR:
FRANK H. SCHWAIGER
BY
Gravely, Lieder & Woodruff
ATTORNEYS,

United States Patent Office 3,511,165
Patented May 12, 1970

3,511,165
WORT COOLER
Frank H. Schwaiger, St. Louis, Mo., assignor to Anheuser-Busch, Incorporated, St. Louis, Mo., a corporation of Missouri
Filed Apr. 10, 1967, Ser. No. 629,688
Int. Cl. C12c 7/04
U.S. Cl. 99—278
8 Claims

ABSTRACT OF THE DISCLOSURE

In a wort cooler having a vertical shell with upper and lower headers, a plurality of tubes vertically mounted within said cooler, said tubes having portions extending into the headers, in which air is blown up through the tubes and the wort flows down along the inner surfaces of the tubes, the cooler being divided into three cooling zones or sections (one cooled with air, one cooled with water, and one cooled with a refrigerant), each of said tubes extending through each cooling section.

---

This invention relates to an improved evaporator and cooler, and in particular, to a wort cooler and evaporator or aerator which may be used in a brewing process.

In the past, breweries have used aerators to aerate and evaporate wort and then coolers to cool the wort. These have been of the plate type. This required two expensive pieces of equipment, each of which was not as efficient in performing its individual function as the new wort cooler described herein. A prior aerator and wort cooler are shown in my Pat. No. 2,359,876 granted Oct. 10, 1944.

One of the principal objects of the present invention is to provide a wort cooler in which the hot wort is spread out in a thin film within tube walls, aerated and cooled in three phases, some aeration taking place in each of said phases. Another object is to provide a falling film of wort along an inner tubular surface which extends downwardly through an air cooling zone, a water cooling zone, and a cold refrigerant zone. Another object is to provide a top opening in a tube for permitting wort to fall downwardly within the tube in a thin film on the inner surface. Another object is to provide a lower end on a tube which permits the wort to fall into the lower header in a controlled manner and also permits air to be blown upwardly through the center of the tube. Another object is to provide some agitation or disturbance of the wort with air blown up through a tube. Another object is to provide a wort cooler having no parts which must be moved either during operation or during cleaning, thereby reducing the possibility of leakage. Another object is to provide a wort cooler which takes less floor space, is smaller, more compact, weighs less, requires less maintenance and clean up time, than with the prior aerators and coolers.

The invention is embodied in a wort cooler having a shell with a header at each end, a plurality of tubes vertically mounted within the cooler between said headers, means for blowing air up through the tubes and allowing wort to flow down along the inner surfaces of the tubes, the cooler being divided into a plurality of cooling sections, said tubes extending through each cooling section. The invention is also embodied in a process for aerating and cooling wort within a limited predetermined period of time.

Figure 1:
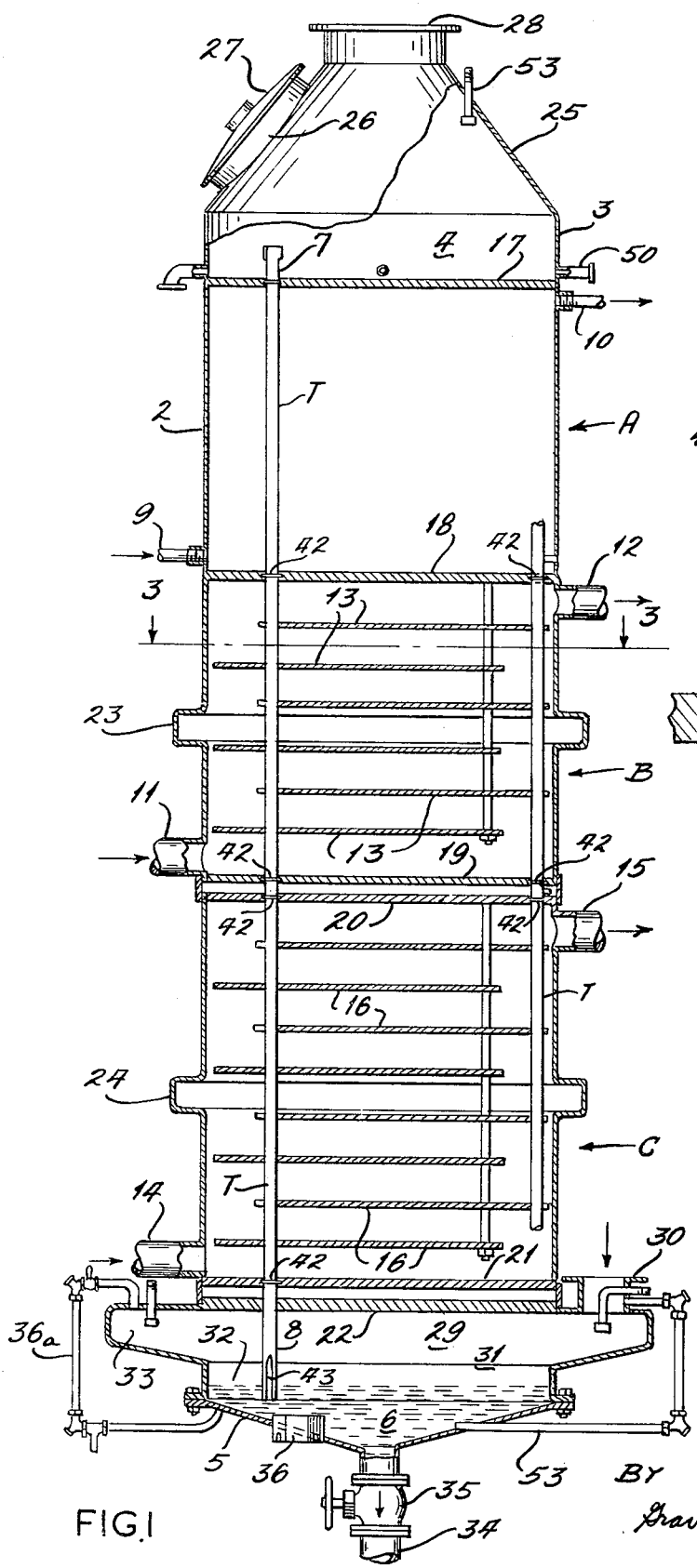
Figure 4:
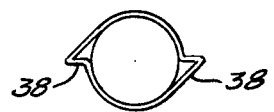
Figure 5:
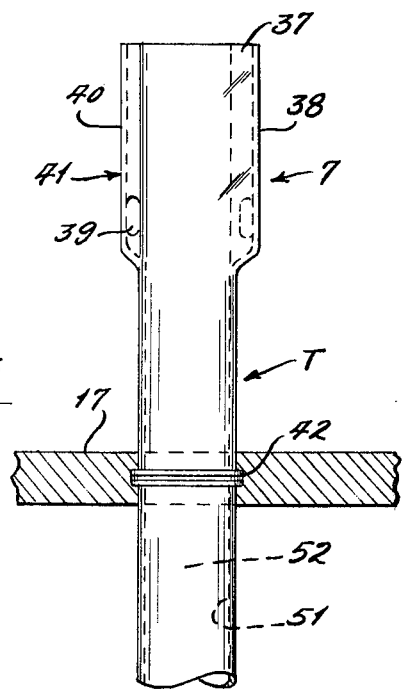
Figure 6:
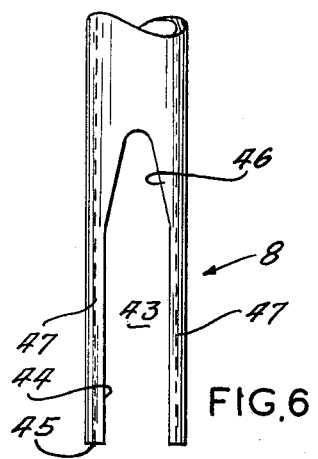
Figure 2:
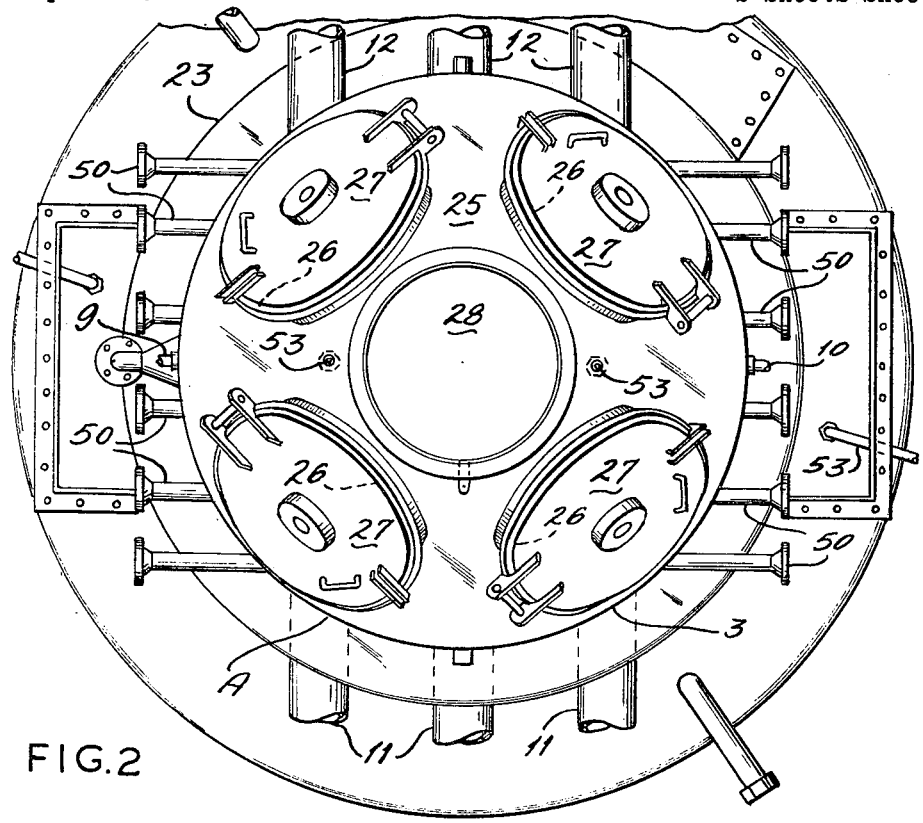
Figure 3:
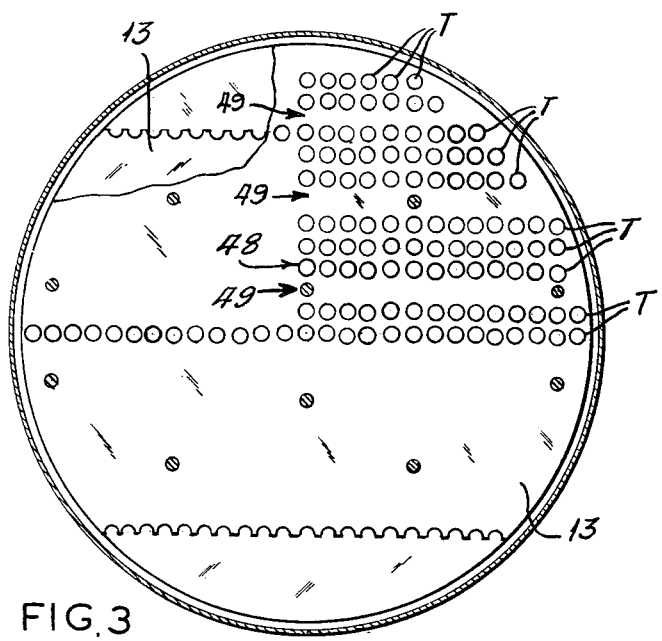

The invention also consists in the parts and in the arrangements and combinations of parts hereinafter described and claimed. In the accompanying drawings, which form part of this specification and wherein like numerals and symbols refer to like parts wherever they occur:

FIG. 1 is a fragmentary vertical cross-sectional view of a wort cooler embodying the present invention, FIG. 2 is a fragmentary top plan view of said wort cooler, FIG. 3 is a horizontal cross-sectional view taken along the line 3—3 of FIG. 1 showing the position and spacing of the tubes, FIG. 4 is an enlarged top view of a tube, FIG. 5 is an enlarged fragmentary view of the top portion of a tube, and FIG. 6 is an enlarged fragmentary view of the bottom portion of a tube.

Referring now to the drawings in detail, it will be seen that the embodiment of the invention which has been illustrated comprises a wort evaporator and cooler 1 having a vertical shell 2 with an upper head 3 with an upper chamber 4 therein and a lower head 5 with a lower chamber 6 therein. A plurality of seamless tubes T are vertically mounted within the cooler 1. Each tube T is continuous and has an upper end 7 extending into the upper chamber or header 4 and a lower end 8 extending into the lower chamber or header 6. The upper and lower chambers 4 and 6 and the tubes T are made from stainless steel. All metal surfaces which come in contact with the wort are made of stainless steel. The remaining metal parts may be made of any suitable metal, such as carbon steel.

The vertical shell 2 of the cooler 1 is divided into three sections or zones: an upper air zone A, a central water zone B, and a lower cold refrigerant zone C through which each of the tubes T pass. Each zone works on a counter flow principle. The upper or air zone A provides little or no cooling of the wort within the tubes T but has an air inlet 9 in the shell 2 near the bottom of the air zone A and an air outlet 10 in the shell 2 near the top of the air zone A. The purpose of the air zone A is to allow for the aeration of the wort within the tubes T. In this zone A, the wort absorbs little oxygen because of the high temperature of the wort. The air zone A enhances evaporation and aeration. Most evaporation or concentration of the wort takes place in this zone, since the wort within the tubes T is at the highest temperature in this zone.

The central or water zone B provides for the pre-cooling of the wort, some evaporation, and absorption of oxygen into the wort. The oxygen pick-up within the wort becomes significant in this water zone B. The water zone B has a water inlet 11 in the shell 2 near the lower end of the water zone B and a water outlet 12 in the shell 2 near the upper end thereof. The water zone B has horizontal baffles 13 mounted in spaced relation on suitable supports therein to lengthen the distance which the water must travel from the inlet 11 to the outlet 12 and to provide for better and more uniform temperature control of the exterior of all tubes T at any horizontal level within the water zone B. In practice, water comes into the water inlet 11 at about 75° F. and leaves the water outlet 12 at about 80° to 110° F. These temperatures may vary depending upon the size of the parts, the capacity, and the various temperatures of the wort received from the air zone A.

The lower or cold refrigerant zone C provides for further cooling of the wort, a little evaporation, and a greater absorption of oxygen into the wort. The oxygen pick-up within the wort is very significant in the refrigerant zone C where the wort is coldest. The refrigerant zone C has a refrigerant inlet 14 in the shell 2 near the lower end of the refrigerant zone C and a refrigerant outlet 15 in the shell 2 near the upper end thereof. The refrigerant zone C has horizontal baffles 16 mounted in spaced relation on suitable supports therein to lengthen the distance which the water must travel from the inlet 14 to the outlet 15 and to provide for better and more uniform temperature control of the exterior of all tubes T at any horizontal level. Suitable controls, gauges, and detection devices are provided for the zones B and C. It is essential that two separate cooling zones are used, since one will not produce the proper temperatures required for my specific purposes. In practice, refrigerant comes into the inlet 14 at about 28° F. and leaves the refrigerant outlet 15 at about 38° to 42° F. These temperatures may vary depending upon the size of the parts, the capacity, and the various temperatures of the wort in the previous zones. The refrigerant may be glycol, ammonia, or Freon, but it should not be too cold or the liquid inside the pipe might tend to freeze. One single cooling zone will not give the proper temperature breakdown for the wort, as do the separate water zone B and refrigerant zone C.

The wort cooler 1 has an upper divider 17 made of stainless steel which separates the upper chamber 4 from the air zone A. The air zone A is provided with a lower divider 18 which forms the upper wall of the water zone B, which has a lower divider 19. The refrigerant zone C has an upper divider 20 adjacent to but spaced from the lower water zone divider 19 and a lower divider 21. The lower chamber 6 has an upper divider or plate 22 of stainless steel spaced slightly from the refrigerant zone lower divider 21. Thus there are double dividers 19 and 20 between the water zone B and refrigerant zone C to prevent leakage of the water and refrigerant into one another, and there are double dividers 21 and 22 between the refrigerant zone C and the wort in the lower chamber 6 to prevent any possible leakage of any refrigerant into the wort. The shell 2 may have expansion joints 23 and 24 in the water zone B and in the refrigerant zone C if desired, but such may not be required in some installations. The necessity of the expansion joints depends upon the characteristics of the material, the dimensions of the wort cooler, and the temperatures at various points within the wort cooler.

The upper head 3 has a sloping top portion 25 with a number of manholes 26 therein, each with a manhole cover 27 hinged thereto, and a top air outlet 28. The top air outlet 28 must be sufficiently large to receive the air from the many tubes T within the cooler 1.

The bottom head 5 is larger in diameter than the shell 2 to provide a large air chamber 29 for a quantity of air which is received from the air inlet 30 and held in the air chamber 29, which has a portion 31 directly above the level 32 of the wort and an annular portion 33 to provide a sufficient quantity of upwardly moving air for each tube T. The lower chamber 6 is also provided with a wort outlet 34 having a valve 35 therein automatically operated by a level sensor 36 which maintains the level 32 of the wort at the desired level, to be explained later. The bottom head 5 is also provided with a level gauge 36a so that the level of the liquid in the bottom head 5 and lower chamber 6 can be visually checked at all times.

The upper and lower ends 7 and 8 of the tubes T are best shown in FIGS. 4–6. The upper end 7 extends above the upper divider or plate 17 a distance of about 10 inches, but this distance may vary. The upper end 7 has an upper edge 37 and two projections 38 and with slots or openings 39 below the upper edge 37 and a predetermined distance above the plate 17. The slots 39 are positioned 180° apart. The projections 38 form an enlarged portion 40 in the upper end 7 of each tube T. The hot wort level 41 is maintained somewhere within this enlarged portion 40, but does not reach the upper edge 37 of the tube T. Each seamless tube T is press fitted or rolled into the plate 17, as at 42, and is secured in leakproof relation in the dividers 18, 19, 20, 21, and 22.

The lower end 8 of each tube T is provided with two slots 43 180° apart which are of uniform width at their bottom portion 44 adjacent to the bottom edge 45 and slope inwardly in a sloping portion 46. The lower portions 47 of the tube T provide a carrier for the wort film allowing the film to reach the aerated and cooled wort level 32 in the lower chamber 6, which level 32 is above the bottom edge 45 of the tube T but below the sloping portion 46 of the slots 43. In this way, the film of wort is constantly added to the lower chamber 6 without falling or agitation, which would cause foaming of the wort, and the slots 43 remain open to air in the large air chamber 29 and are free to receive the necessary quantity of air which must move upwardly through the tubes T at all times.

The incoming air is controlled and is under pressure. About 1,000 to 3,000 cubic feet per minute are introduced at about 128° F. The upward movement of this air through the tubes T in contacting relation with the wort helps stability and results in improved beer quality. The amount of incoming air can be varied so that there may be some agitation of the hot wort film as it passes through the tubes T. This agitation may be desirable in some instances to enhance evaporation. Increasing the amount of air will increase the agitation.

As best shown in FIG. 3, the tubes T are arranged in rows 48 with aisles 49 therebetween. Opposite to each aisle 49 in the upper head 3 are positioned the inlets 50 for permitting the hot wort to move in an unobstructed manner through the aisles 49 to insure that each tube T receives a sufficient amount of wort. Six inlets 50 on either side of the wort cooler 1 are provided and these direct hot wort into the aisles 49, which in turn assure each tube T and the openings 39 therein the proper amount of wort to provide a thin film along the inner wall of each of the tubes T. The tubes T in each row 48 have their projections 38 and openings 39 similarly oriented, so that the portion of the projection which is tangentially extending to the tube T is parallel to the row 48 and aisles 49.

In operation, hot wort from the wort kettle or wort receiving tank is directed into the inlets 50 in the upper chamber 4 at about 200° to 210° F. This wort is distributed to each tube T and moves through the openings 39 therein to form a thin film along the inner surfaces 51 of each tube T. This film moves downwardly through the continuous tube T from the upper chamber 4 to the lower chamber 6. During this downward movement, air is directed upwardly through the hollow center 52 of each tube T to aerate and evaporate the wort. As the wort moves downwardly within the tube T through the air zone A, its temperature is reduced from 200° F. or more down to about 150° F. and is cooled to about 80° F. therein in less than about 2.5 seconds. The wort then enters the refrigerant zone C at about 80° F. and is cooled to about 43° to 48° F. by the time (about less than 2.5 seconds) it reaches the wort level 32 in the lower chamber 6. The air is received from the air inlet 30 and moves into the air chamber 29 from which it moves under pressure upwardly through each tube T and then out through the large air outlets 28 at the top of the cooler 1.

The air in the air zone A surrounding the tubes T is at the surrounding temperature and does not flow. In the water zone B water coming into the water inlet 11 is about 75° F. and leaves through the water outlet 12 at about 80° to 110° F. In the refrigerant zone C, the refrigerant comes into the inlet 14 at about 28° F. and leaves the outlet 15 at 38° to 42° F. The refrigerant may be any suitable commercial type, such as glycol or ammonia or Freon. The heights of the different zones may vary depending upon conditions, but in some installations, the air zone might be 4.5' high, the water zone 4.5' high, and the refrigerant zone 5.5' high. The tubes T may have an outer diameter of 2" and be made of 18 gauge stainless steel. The total height of the wort cooler 1 is about 21.5'. The diameter of the shell 2 may be 5.33', and the diameter of the bottom chamber 8.33'. The tubes T are rolled into the dividers so that no wort contacts any welds.

During the falling of the wort, aeration and evaporation take place, oxygen is introduced therein, and the oxidizable material in the wort is oxidized. This gives certain desirable advantages and characteristics to the final beer. The amount of oxygen which is absorbed in the wort is important for the future steps in the brewing process. A wort cooler embodying this invention provides for continuous aeration and cooling in stages immediately following one another without any delay therebetween. The entire time for wort to be aerated and cooled during its drop through the tubes T is less than about 5 seconds. Cooling the wort from about 160° F. to 45° F. in about 5 seconds is considered to be important to the quality of the beer.

The wort cooler 1 can be cleaned with cleaning solution, such as a hot caustic solution. During cleaning, the water and refrigerant surrounding the tubes T is not disturbed, since only those surfaces, which are made from stainless steel and which the wort contacts, need to be cleaned periodically. With the supply of wort shut off and all wort removed from the wort cooler 1, the cleaning solution is directed into the upper chamber 4 in such great volume that its level is about the top edge 37 of the tubes T. This permits the cleaning solution to clean all surfaces which the wort might contact in the upper chamber 4 and in the tubes T. Cleaning solution is also directed into the lower chamber 6 through the inlet 53 until it rises to the level of the upper divder 22, so that the lower portions 8 of the tubes T within the lower chamber 6 are all exposed to the cleaning solution. In this way, all surfaces exposed to the wort can be cleaned periodically with cleaning solution, as is well known in the art.

Although the words wort cooler have been used throughout the specification and claims, it will be understood that the invention applies equally to coolers used to cool other liquids, especially liquids which foam, whether the liquid be wort or milk or some other substance, and the words "wort cooler" as used herein are to be so interpreted.

This invention is intended to cover all changes and modifications of the example of the invention herein chosen for purposes of the disclosure which do not constitute departures from the spirit and scope of the invention.

What is claimed is:

1. In a wort cooler having a vertical shell with upper and lower chambers, a plurality of tubes vertically mounted within said cooler, said tubes having portions extending into said upper and lower chambers, means for allowing wort to flow downwardly along the inner surfaces of said tubes, means for blowing air upwardly through the central portions of said tubes, said cooler being divided into three sections each being adjacent to and independent of the other, one of said sections being an evaporator cooled with air, the second of said sections being cooled with water, and the third of said sections being cooled with a refrigerant, each of said tubes extending through each of said sections.

2. The wort cooler set forth in claim 1 wherein the upper chamber is separated from said sections by an upper divider and said lower chamber is separated from said sections by a lower divider, and wherein the opening in the wall of each of said tubes is positioned a predetermined distance above said upper divider and a predetermined distance below the top of said tubes.

3. The wort cooler set forth in claim 1 wherein the top of each tube is open and the top portion of the wall of each tube is provided with at least one opening for allowing liquid within the upper chamber to enter the tube and flow downwardly along the inner surface of each tube.

4. The wort cooler set forth in claim 1 wherein the bottom of each tube is provided with at least one vertical slot extending upwardly from the bottom edge of the tube, said bottom edge being positioned within the liquid in the lower chamber and the top of the slot being positioned above the liquid level to permit air to be directed upwardly through the tube.

5. The wort cooler set forth in claim 1 wherein the upper chamber is separated from said sections by an upper divider and said lower chamber is separated from said sections by a lower divider, and therein the slot extending upwardly from the bottom edge of each tube terminates below said lower divider.

6. The wort cooler set forth in claim 1 wherein the water and refrigerant cooling sections have inlets near the bottom and outlets near the top to provide counterflow cooling sections adjacent to one another and immediately after the evaporator section cooled with air.

7. The wort cooler set forth in claim 1 wherein the water section and the refrigerant section each have baffles therein to lengthen the distance which each coolant must travel from its respective inlet to its respective outlet.

8. The wort cooler set forth in claim 7 wherein the baffles are horizontally positioned in spaced relation so that the coolant flows horizontally from one level to a higher level in a tortuous path from the inlets to the outlets thereabove.

References Cited

UNITED STATES PATENTS

| 1,493,757 | 5/1924 | Bour | 99—277 |
| 2,359,876 | 10/1944 | Schwaiger | 99—278 |
| 3,001,467 | 9/1961 | Stackler | 99—278 |

ROBERT W. JENKINS, Primary Examiner

U.S. Cl. X.R.

99—52